(12) United States Patent
Avidan et al.

(10) Patent No.: US 7,477,800 B2
(45) Date of Patent: Jan. 13, 2009

(54) METHOD FOR RETARGETING IMAGES

(75) Inventors: Shmuel Avidan, Brookline, MA (US); Ariel Shamir, Jerusalem, IL (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 12/170,959

(22) Filed: Jul. 10, 2008

(65) Prior Publication Data
US 2008/0267528 A1  Oct. 30, 2008

Related U.S. Application Data

(63) Continuation of application No. 11/682,521, filed on Mar. 6, 2007.

(51) Int. Cl.
G06K 9/32  (2006.01)
G06K 9/40  (2006.01)

(52) U.S. Cl. ........................................ 382/298; 382/254

(58) Field of Classification Search ................ 382/298, 382/254
See application file for complete search history.

(56) References Cited

U.S. PATENT DOCUMENTS

| | | | |
|---|---|---|---|
| 6,195,445 B1 * | 2/2001 | Dubuisson-Jolly et al. | .. 382/107 |
| 6,563,964 B1 | 5/2003 | Hallberg | |
| 6,919,903 B2 | 7/2005 | Freeman et al. | |
| 7,038,185 B1 | 5/2006 | Tumblin et al. | |
| 2003/0234866 A1 * | 12/2003 | Cutler | ...................... 348/207.1 |
| 2006/0072853 A1 | 4/2006 | Clarke et al. | |
| 2007/0025637 A1 * | 2/2007 | Setlur et al. | ................. 382/276 |
| 2007/0237420 A1 | 10/2007 | Steedy et al. | |

OTHER PUBLICATIONS

Perez et al., 2003. Poisson Image Editing. SIGGRAPH'03. ACM, New York, NY, pp. 313-318.
Lui et al., 2006. Automatic Estimation and Removal of Noise from a Single Image, Microsoft Research Technical Report MSR-TR-2006-180.
Suh et al., 2003. Automatic thumbnail cropping and its effectiveness. UIST '03: Proceedings of the 16th annual ACM symposium on User interface software and technology, ACM Press, New York, NY, USA, pp. 95-104.
Chen et al., 2003. A visual attention model for adapting images on small displays. Multimedia Systems 9, 4, pp. 353-364.
Santella et al., 2006. Gaze-based interaction for semiautomatic photo cropping. ACM Human Factors in Computing Systems (CHI), pp. 771-780.
Jacobs et al. 2003. Adaptive grid-based document layout. Proceedings of ACM SIGGRAPH, pp. 838-847.
Liu et al., 2005. Automatic image retargeting with fisheye-view warping. ACM UIST, pp. 153-162.
Setlur et al., 2005. Automatic image retargeting. Mobile and Ubiquitous Multimedia (MUM), ACM Press.

(Continued)

*Primary Examiner*—Wenpeng Chen
(74) *Attorney, Agent, or Firm*—Dirk Brinkman; Gene Vinokur

(57) ABSTRACT

A method for content-aware image retargeting generates an energy image from a source image according to an energy function. From the energy image, one or more seams are determined according to a minimizing function such that each seam has a minimal energy. Each seam is applied to the source image to obtain a target image that preserves content and a rectangular shape of the source image.

18 Claims, 13 Drawing Sheets

OTHER PUBLICATIONS

Gal et al., 2006. Feature aware texturing. Eurographics Symposium on Rendering.

Agarwala et al., 2004. Interactive digital photomontage. ACM Trans. Graph. 23, 3, pp. 294-302.

Jia et al., 2006. Drag-and-drop pasting. Proceedings of SIGGRAPH.

Rother et al., 2006. AutoCollage. Proceedings of SIGGRAPH.

Wang et al., 2006. Simultaneous matting and compositing. Microsoft Research Technical Report, MSR-TR 2006-63 (May).

Zomet et al., 2005. Seamless image stitching by minimizing false edges. IEEE Transactions on Image Processing 15, 4, pp. 969-977.

Bertalmio et al., 2000. Simultaneous structure and texture image inpainting. Proceedings IEEE Conference on Computer Vision and Pattern Recognition, pp. 707-714.

Driori et al. 2003. Fragment-based image completion. Proceedings of ACM SIGGRAPH, pp. 303-312.

Criminisi et al., 2003. Object removal by exemplar-based inpainting. IEEE Conference on Computer Vision and Pattern Recognition, pp. 417-424.

Sun et al. 2005. Image completion with structure propagation. Proceedings of ACM SIGGRAPH.

Lui et al., 2006. Automatic Estimation and Removal of Noise from a Single Image, Microsoft Research Technical Report MSR-TR-2006-180.

Perez et al., 2003. Poisson Image Editing. SIGGRAPH '03. ACM, New York, NY, pp. 313-318.

K. Murty, 1992. Network Programming. Prentice Hall, Englewood Cliffs, N.J., pp. 168-187.

* cited by examiner

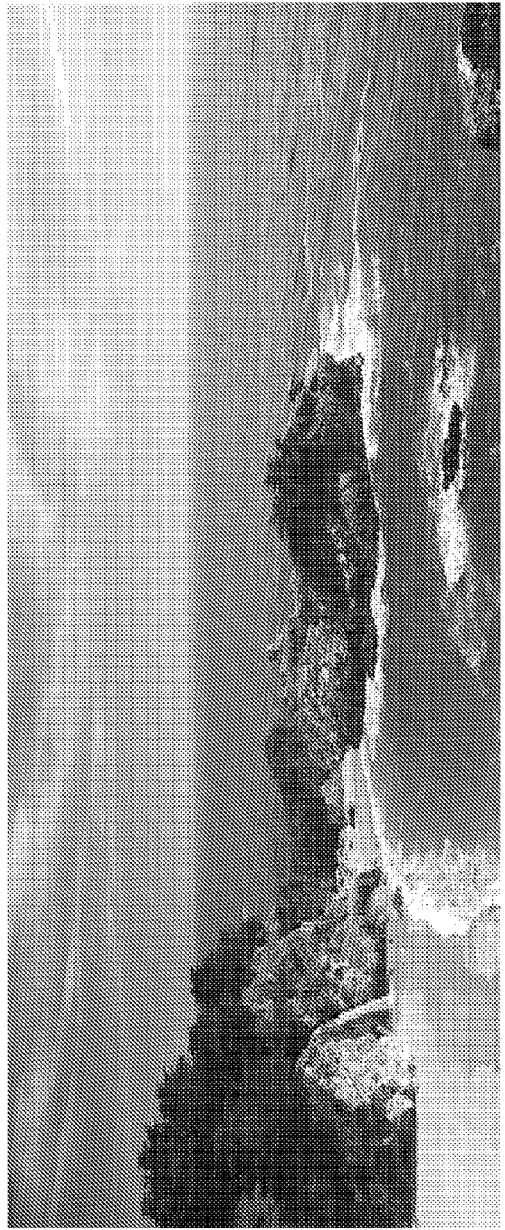
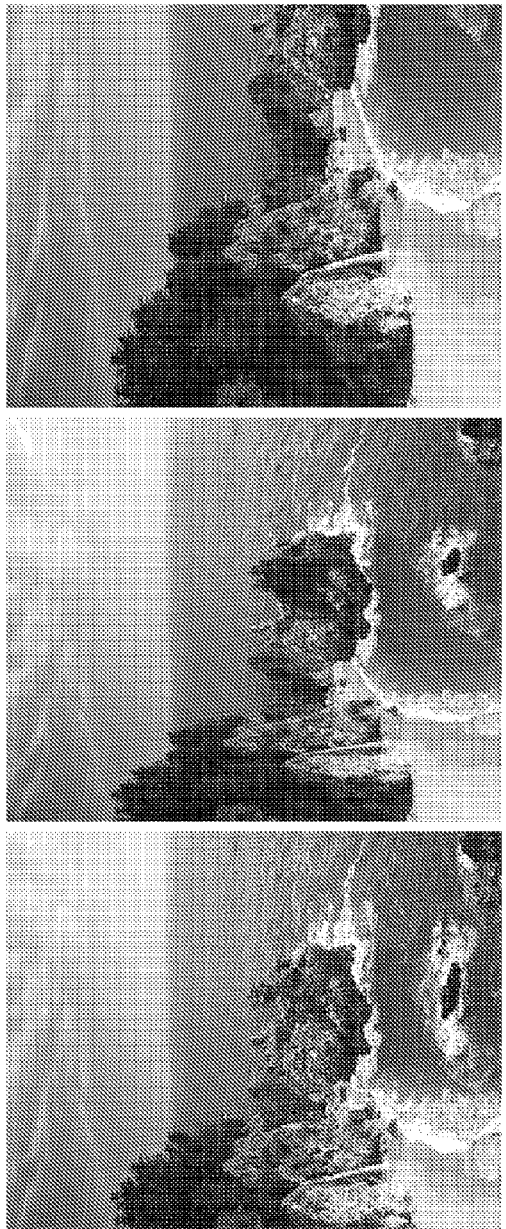
Fig. 2A
Fig. 2B     Fig. 2C Prior Art     Fig. 2D Prior Art

METHOD FOR RETARGETING IMAGES

CROSS-REFERENCE TO RELATED APPLICATION

This application is a Continuation of prior U.S. patent application Ser. No. 11/682,521, filed Mar. 6, 2007, by Avidan et al.

FIELD OF THE INVENTION

This invention relates generally to image processing, and more particularly to retargeting images.

BACKGROUND OF THE INVENTION

The diversity and versatility of print and display devices imposes demands on designers of multimedia content for rendering and viewing. For instance, designers must provide different alternatives for web-content and design different layouts for different rendering applications and devices, ranging from tiny "thumbprints" of images—often seen in selection menus; small, low resolution mobile telephone screens; and slightly larger PDA screens—to large images—often seen in high resolution, elongated, flat panel displays and projector screens. Adapting images to different rendering applications and devices than originally intended is called image retargeting.

Conventional image retargeting typically involves scaling and cropping. Image scaling is insufficient because it ignores the image content and typically can only be applied uniformly. Scaling also does not work well when the aspect ratio of the image needs to change because it introduces visual distortions. Cropping is limited because it can only remove pixels from the image periphery. More effective resizing can only be achieved by considering the image content as a whole, in conjunction with geometric constraints of the output device.

Image resizing is an alternative tool for image retargeting. Image resizing works by uniformly resizing a source image to a size of a target display. While resizing an image, there is a desire to change the size of the image while maintaining important features in the content of the image. This can be done with top-down or bottom-up methods. Top-down methods use tools such as face detectors to detect important regions in the image, whereas bottom-up methods rely on visual saliency methods to construct a visual saliency map of the source image. After the saliency map is constructed, cropping can be used to display the most important region of the image.

One method automatically generates thumbnail images based on either a saliency map or the output of a face detector, Suh et al., "Automatic thumbnail cropping and its effectiveness," UIST '03: Proceedings of the 16th annual ACM symposium on user interface software and technology, ACM Press, New York, N.Y., USA, 95-104, 2003. A source image is cropped to capture the most salient region in the image. Another method adapts images to mobile devices, Chen et al., "A visual attention model for adapting images on small displays," Multimedia Systems, vol. 9, no. 4, 353-364, 2003. In that method, the most important region in the image is automatically detected and transmitted to the mobile device.

Another method use eye tracking, in addition to composition rules, to crop images intelligently, Santella et al., "Gaze-based interaction for semiautomatic photo cropping," Proceedings of the SIGCHI conference on human factors in computing systems, 771-780, 2006, incorporated by reference. In that method, a user looks at an image while eye movements are recorded. The recordings are used to identify important image content and can then automatically generate crops of any size or aspect ratio.

All of the above rely on conventional image resizing and cropping operations to retarget the image.

Another method uses an adaptive grid-based document layout that maintains a clear separation between image content and a template, Jacobs et al., "Adaptive grid-based document layout," Proceedings of ACM SIGGRAPH, 838-847, 2003. A designer constructs several possible templates. When the content is displayed, the most suitable template is used.

A compromise between image resizing and image cropping is to use non-linear, data-dependent scaling for image retargeting, Liu et al., "Automatic Image Retargeting with Fisheye-View Warping," ACM UIST, 153-162, 2005. They use image information, such as low-level salience and high-level object recognition, to find important regions in the source image. Then, they apply a non-linear image warping function to emphasize important aspects of the image while retaining the surrounding context.

Another method uses an automatic, non-photorealistic method for retargeting large images to small size displays, Setlur et al., "Automatic Image Retargeting," Proceedings of the 18th annual ACM symposium on user interface software and technology, 153-162, ACM Press, 2005. They decompose the image into a background layer and foreground objects. Their retargeting method segments an image into regions, identifies important regions, removes them, fills in the resulting gaps, resizes the remaining image, and re-inserts the important regions.

Another method uses a feature-aware texture mapping that warps an image to a new shape, while preserving user-specified regions, Gal et al., "Feature aware texturing," Eurographics Symposium on Rendering, 2006. They solve a particular formulation of the Laplace editing technique suited to accommodate similarity constraints in images. However, local constraints are propagated through the entire image to accommodate all constraints at once, and may sometimes fail.

Another method composes a novel photomontage from several images, Agarwala et al., "Interactive digital photomontage," ACM Trans. Graph. 23, 3, 294-302, 2004. A user selects ROIs from different input images, which are then composited into an output image. Another method uses drag-and-drop pasting, Jia et al., "Drag-and-drop pasting," Proceedings of SIGGRAPH, 2006. They determine an optimal boundary between the source and target images. Another method generates a collage image from a collection of images, Rother et al., "Autocollage," Proceedings of SIGGRAPH, 2006. None of these compositing methods address image retargeting.

Another method simultaneously solves matting and compositing, Wang et al., "Simultaneous Matting and Compositing," Microsoft Research Technical Report, MSR-TR-2006-63, May 2006. They allow the user to scale the size of a foreground object and paste the object back onto the original background.

Another method "stitches" images together based on a cost functions, Zomet et al., "Seamless image stitching by minimizing false edges," IEEE Transactions on Image Processing 15, 4, 969-977, 2005. They minimize an $L_1$ error norm between the gradients of a stitched image and the gradients of the input images.

Changing the appearance of an image has been extensively described in the field of texture synthesis, where the goal is to generate an output image that has different texture than an input image, while preserving the basic idea of the content, U.S. Pat. No. 6,919,903, "Texture synthesis and transfer for pixel images," issued to Freeman et al. on Jul. 19, 2005. That method does not consider image retargeting.

Another method performs object removal, Bertalmio et al., "Simultaneous structure and texture image inpainting," Proceedings IEEE Conference on Computer Vision and Pattern Recognition, 707-714, 2000. They use image inpainting to smoothly propagate information from the boundaries inwards, simulating painting restoration.

Patch based methods, approaches use automatic guidance to determine synthesis ordering, are known: "Fragment-based image completion," Proceedings of ACM SIGGRAPH, 303-312, 2003, and Criminisi et al., "Object removal by exemplar-based inpainting," IEEE Conference on Computer Vision and Pattern Recognition, 417-424, 2003.

Another interactive method provides inpainting for images missing strong visual structure by propagating structure along user-specified curves, Sun et al., "Image completion with structure propagation," Proceedings of ACM SIGGRAPH, 2005.

SUMMARY OF THE INVENTION

The embodiments of the invention provide a method for content-aware image retargeting that uses geometric constraints as well as image content constraints. The embodiments provide minimum energy seam applications that support content-aware image retargeting. The seam applications can reduce and increase the size of images while preserving a rectangular (or square) shape.

As defined herein, a seam is an optimal n-connected set of pixels in an image extending either from the top edge to the bottom edge, or from the left edge to the right edge, where optimality is defined by an energy of the image. A seam is one pixel wide.

By applying the seam to the image, the size of the image can be changed. The applying can either remove or insert seams to change, for example, an aspect ratio of the image, e.g., from 4:3 to 16:9. In a preferred embodiment, the seam is eight-connected.

By applying the seam operation in both directions, a source image can be retargeted for a smaller or larger display. The selection and order of the seams preserves the content of the image, as defined by the energy function.

The seam applications can also be used for image content enlargement and object removal. The embodiments of the invention provide various visual saliency measures for defining the energy of an image, and can also include user input to guide the retargeting process. By storing the order of seams in a memory, a multi-size image can be generated to support real-time retargeting of an image to any size.

BRIEF DESCRIPTION OF THE DRAWINGS

FIG. 2A is a source image according to an embodiment of the invention;

FIG. 2B is a reduced target image obtained from the source image of FIG. 2A according to an embodiment of the invention;

FIG. 2C is a target image obtained from the source image of FIG. 2A by prior art scaling;

FIG. 2D is a target image obtained from the source image of FIG. 2A by prior art cropping;

DETAILED DESCRIPTION OF THE PREFERRED EMBODIMENTS

Figure 1A:
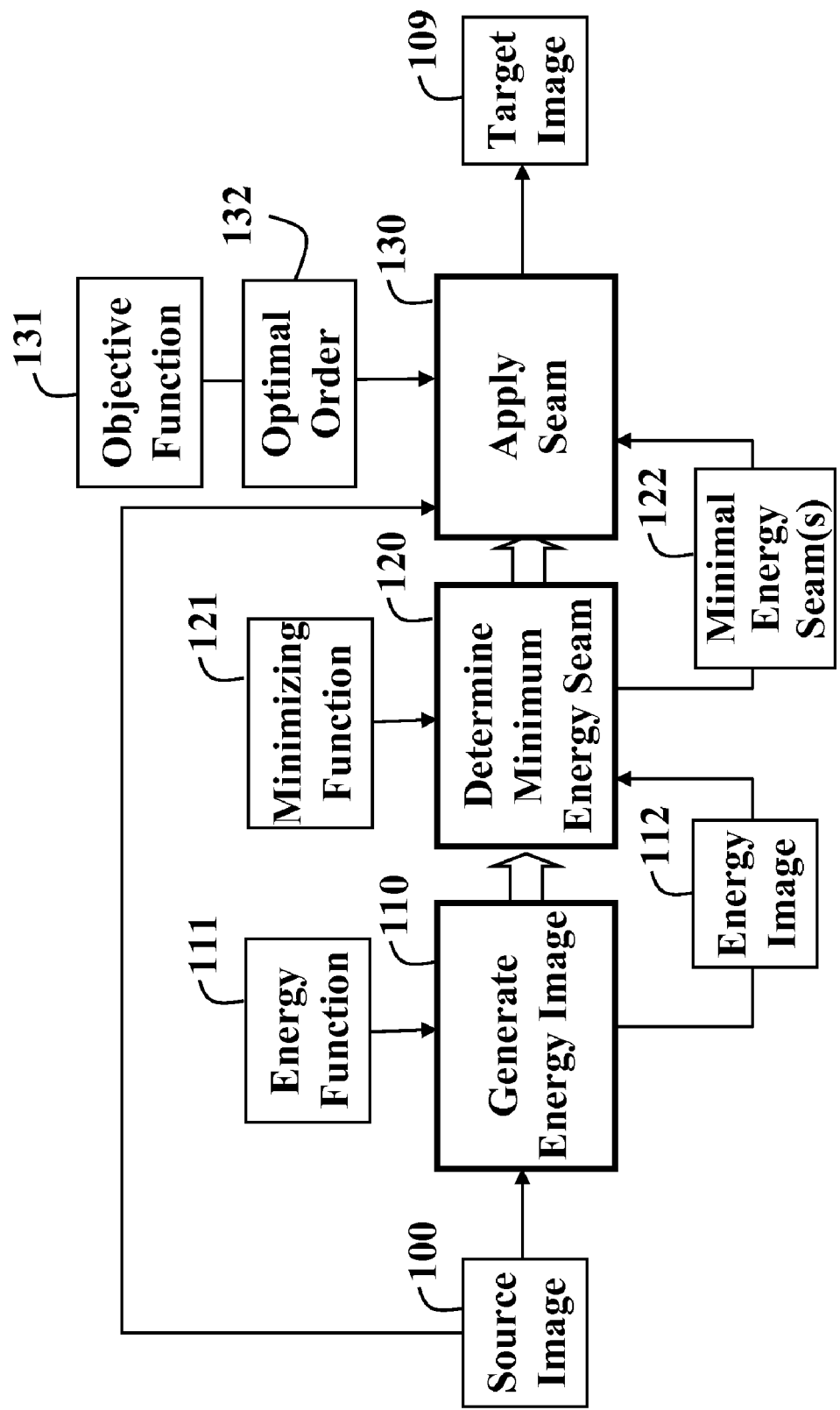
FIG. 1A is a flow diagram of a method for retargeting an image according to an embodiment of the invention.

As shown in FIG. 1A, the embodiments of our invention provide a method for content-aware retargeting of a source image 100 to a target image 109. The retargeting can change a size of the source image while preserving a rectangular shape in the target image. By rectangular shape, we include square shapes.

Input to our method is the source image 100. From the source image, we generate 110 an energy image 112 using an energy function 111. Using a minimizing function 121, we determine 120 one or more minimal energy seams 122. Each seam 122 can then be applied 130, one or more times, to the source image 100 to produce a target image 109. An optimal order 132 in which the seams 122 are applied 130 can be according to an objective function 131.

The application of the seams 122 can increase or decrease the size of an image, change the aspect ratio, remove content (e.g., selected objects), or enlarge the content of the source image while preserving the rectangular shape of the image. The retargeting can be done in either the pixel intensity domain or the gradient domain.

The embodiments of the invention use seam applications, which can change the size of an image by gracefully removing or inserting pixels in different parts of the image. The retargeting uses the energy function 111 to define the 'importance' of pixels in the source image. The retargeting can support several types of energy functions such as gradient magnitude, entropy, visual saliency, eye-gaze movement, and object detections (e.g., faces and/or pedestrian detection).

A seam is defined as a set of pixels, one pixel wide, crossing the image from top edge to the bottom edge, or from the left edge to the right edge. By successively removing or inserting seams, it is possible to reduce, as well as to enlarge, the size of an image in both directions. For image reduction, seam selection ensures that the basic image structure is preserved by removing more of the low energy pixels, while retaining high energy pixels. For content enlargement, the optimal order 132 of seam insertion ensures a balance between the original image content and the artificially inserted pixels. This defines, in effect, retargeting of images in a content-aware fashion. Seam removal and insertion can be used to change the aspect ratio, enlarge image content, and remove objects from the image.

Furthermore, by storing the optimal order 132 of seam removal and insertion applications and by carefully interleaving seams in both vertical and horizontal directions, multi-size images can be defined. Such images can continuously change their size in a content-aware manner. A designer can author a multi-size image once, and the client application, depending on the size needed, can resize the image in real time to fit the exact layout or display.

Our method removes or inserts pixels in an unnoticeable manner using the energy image 112. Particularly, we only remove or insert pixels where the pixels blend with surrounding pixels. Pixels that are similar to or blend with neighboring pixels are said to have a low energy. Pixels that are dissimilar to neighboring pixels are said to have a high energy. Therefore, we generate the energy image 112 from the source image 100 according to the energy function 111:

$$e_1(I) = \left|\frac{\partial}{\partial x}I\right| + \left|\frac{\partial}{\partial y}I\right|, \tag{1}$$

where I(x,y) is a particular pixel. As stated above, other energy functions can also be used.

Given the energy function, there are several ways to change the size of the source image while preserving its basic rectangular (or square) shape. An optimal strategy maximizes as much energy in the target image as possible, i.e., we retain pixels with higher energies, and remove pixels with lowest energies in an ascending order. However, this could change the shape of the image, because we may remove a different number of pixels from each row or column of pixels.

If we want to prevent the image from becoming distorted, then we can remove an equal number of low energy pixels from every row. This preserves the shape of the image but destroys the image content by creating visible zigzag effect. To preserve both the shape and the visual coherence of the image we can use cropping. That is, we locate a sub-window in the source image that is the size of the target image, which has a highest energy. Another possible strategy, somewhat between removing pixels and cropping, is to remove entire columns of pixels with the lowest energy. However, this might still produce annoying artifacts.

Therefore, we use a method that is less restrictive than cropping or column removal, but can still preserve the image content and shape better than single pixel removals. This leads to our seam applications 130, and our definition of seams 122.

Figure 1B:
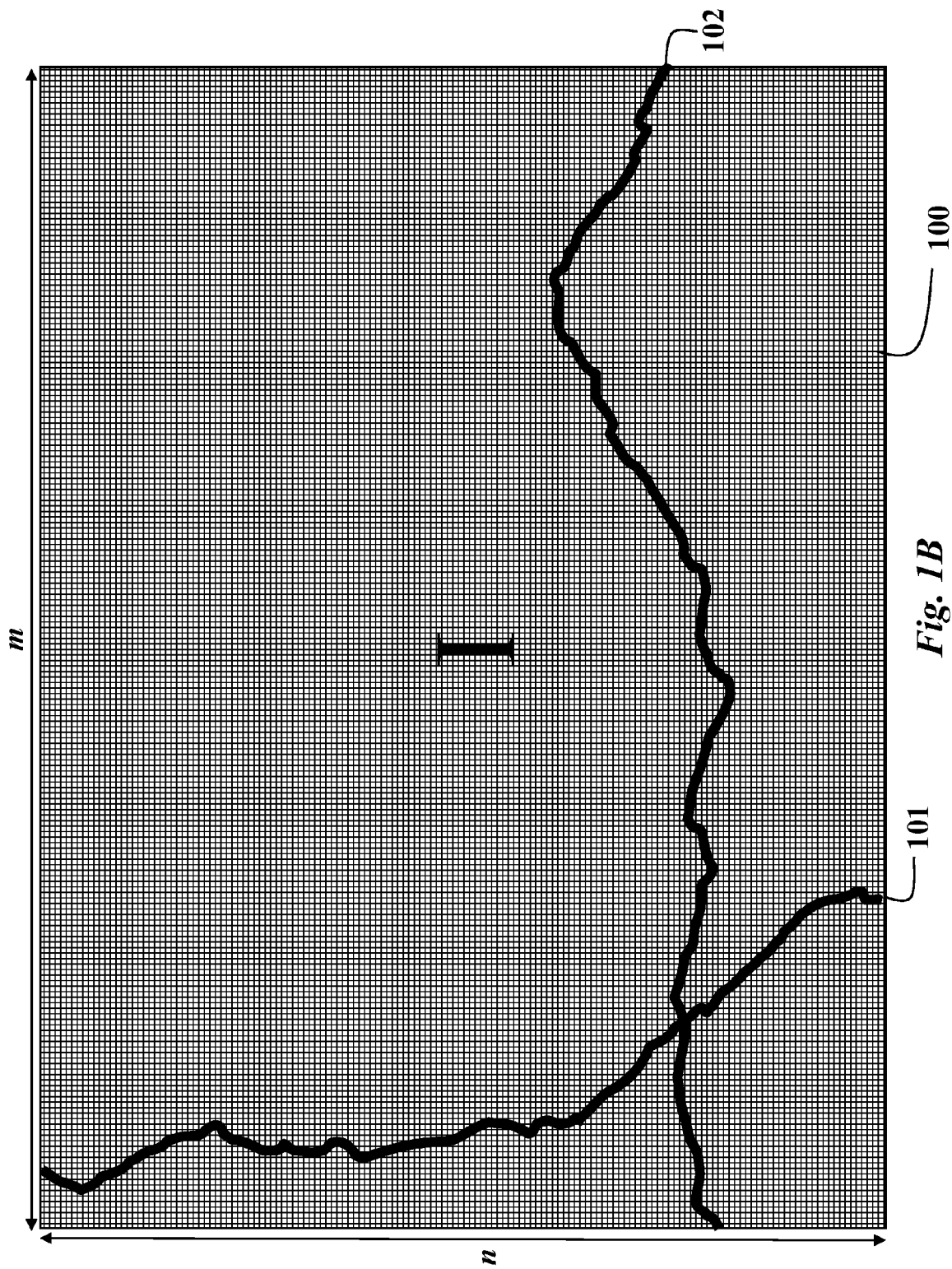
FIGS. 1B-1E are images including seams according to the embodiments of the invention.
Figure 1C:
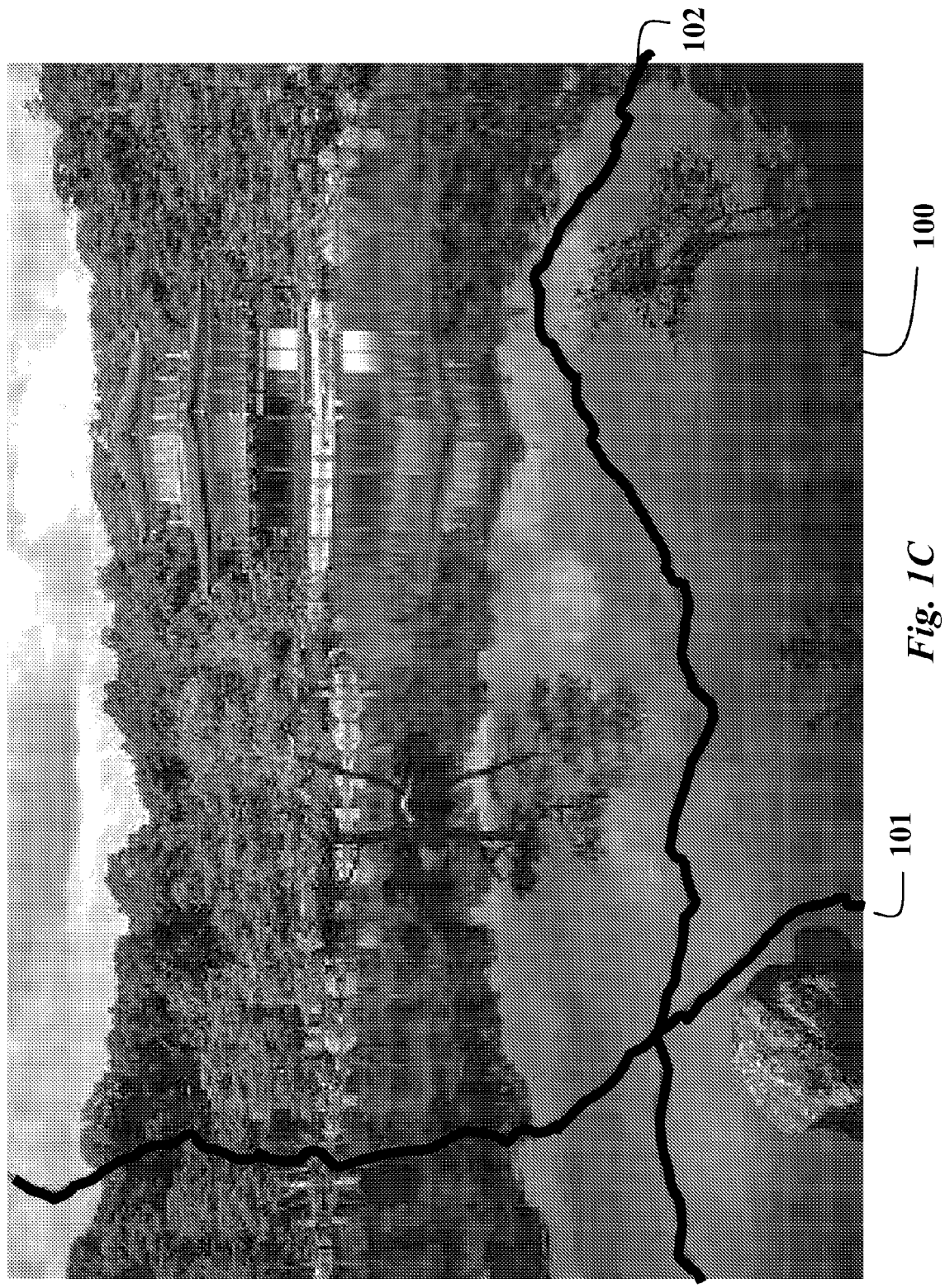

As shown in FIGS. 1B and 1C, the source image 100 has n×m pixels. That is, the image has two dimensions, vertical and horizontal, indexed respectively by n and m.

A seam is a one pixel wide set of pixels through a source image I 100. A seam can extend from one edge of the image to an opposing edge. The edges can be the top and bottom edges, or the left and right edges. The seam has exactly one pixel for each index along a particular dimension in which the seam is oriented. For example, if the orientation dimension is vertical, the vertical seam has exactly n pixels.

A vertical seam 101 is:

$$S^x = \{s_i^x\}_{i=1}^n = \{(x(i), i)\}_{i=1}^n, s.t. \forall i, |x(i)-x(i-1)| \leq 1, \tag{2}$$

where x is a mapping x: [1, ..., n]→[1, ..., m]. That is, the vertical seam 101 is an eight-connected path, from the top edge to the bottom edge, containing one, and only one, pixel in each of n rows of pixels in the image 100.

Similarly, a horizontal seam 102 is:

$$s^y = \{s_j^y\}_{j=1}^m = \{(j, y(j))\}_{j=1}^m, s.t. \forall j, |y(j)-y(j-1)| \leq 1, \tag{3}$$

where y is a mapping y: [1, ..., m]→[1, ..., n]. That is, the horizontal seam 102 is an eight-connected path, from the left edge to the right edge, containing one, and only one, pixel in each of m columns of pixels in the image 100.

The pixels on the path of seam s, e.g., vertical seam $\{s_1\}$ 101, are:

$$I_s = \{I(s_i)\}_{i=1}^n = \{I(x(i), i)\}_{i=1}^n.$$

Note that similar to removing an entire row or column from an image, removing the pixels of a seam from an image has only a local effect. All the pixels of the image are shifted left (or up) to compensate for the removed pixels. The visual impact, if any, is only noticeable only along the seam, leaving the rest of the image intact. If the removed or inserted pixels have a low energy, then the visual impact is negligible.

If an image is a 240×320 image, i.e., has 240 rows of pixels and 320 columns of pixels, then it has a 4:3 aspect ratio. Changing the aspect ratio from 4:3 to 16:9 can be performed either by inserting vertical seams, or by removing horizontal seams. By inserting 106 vertical seams, we obtain a 240×426 image. By removing 60 rows, we obtain a 180×320 image. Both resulting images have a 16:9 aspect ratio. The first method has the advantage of only adding pixels; none of the original pixels are removed.

Figure 1D:
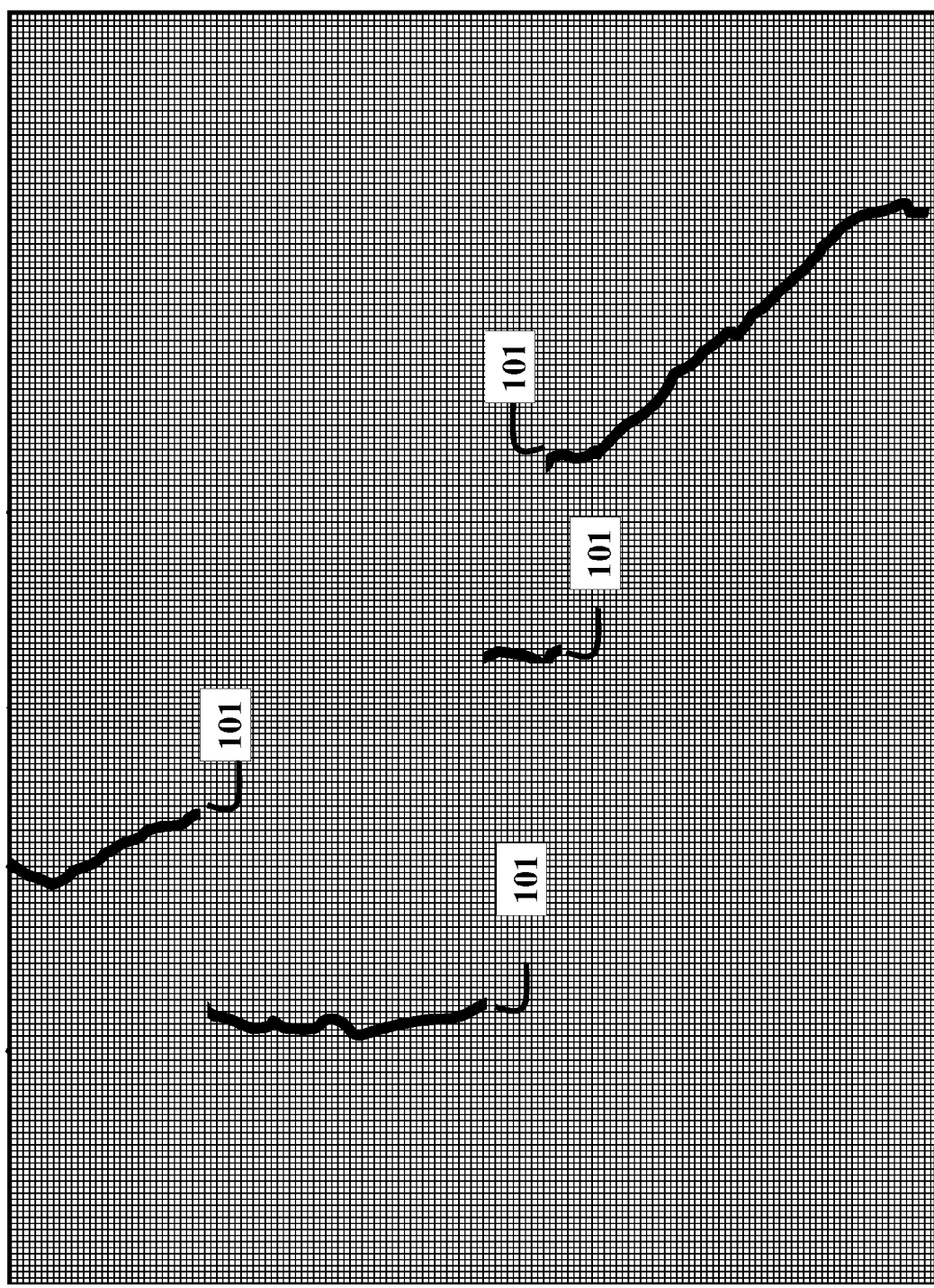
Figure 1E:
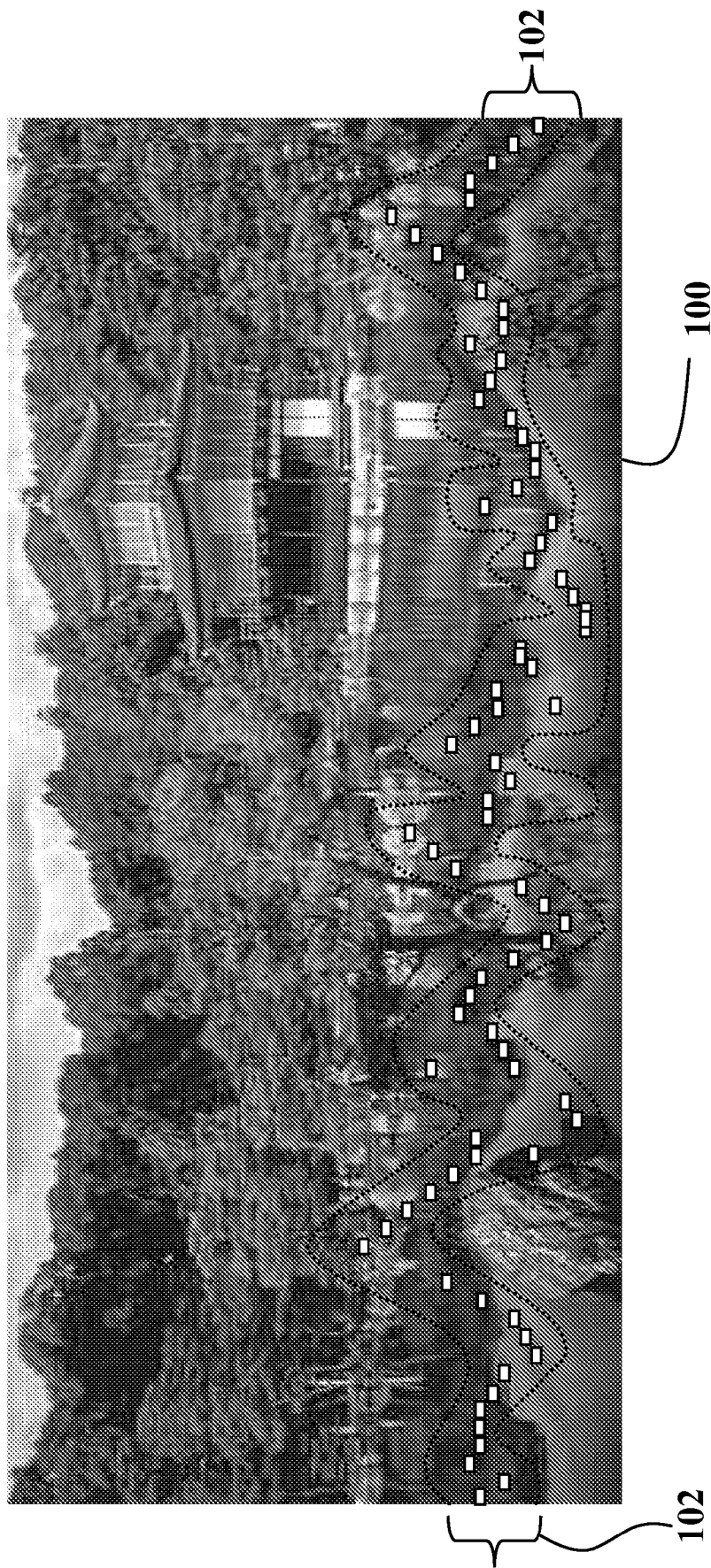

We can replace the constraint $$|x(i)-x(i-1)| \leq 1$$

with $$|x(i)-x(i-1)| \leq k,$$

and obtain either an entire column (or row) for k=0, or a piece-wise connected set of pixels, see FIG. 1D—not to scale, or even a complete or partially disconnected set of pixels for any value 1≤k≤m, see FIG. 1E.

Given the energy function e(I), we define the energy of a seam as $$E(s) = E(I_s) = \Sigma_{i=1}^n e(I(s_i)),$$

We use the following minimizing function 121 to locate the optimal minimal energy seam s* 122:

$$s^* = \min_s E(s) = \min_s \sum_{i=1}^n e(I(s_i)). \tag{4}$$

The optimal minimal energy seam s* 122 can be found using dynamic programming. A first step traverses the pixels of the image, one row at the time, and determines a cumulative minimum energy M for all possible seams for each entry:

$$M(i,j) = e(i,j) + \min(M(i-1,j-1), M(i-1,j), M(i-1,j+1))).$$

At the end of this process, the minimum of the last row in M indicates the end of a minimal connected vertical seam. Hence, in the second step, we backtrack from this minimum in row M to find the path of the optimal minimal seam 122. The optimal minimal energy horizontal seams can be found in a similar manner.

Figure 1F:
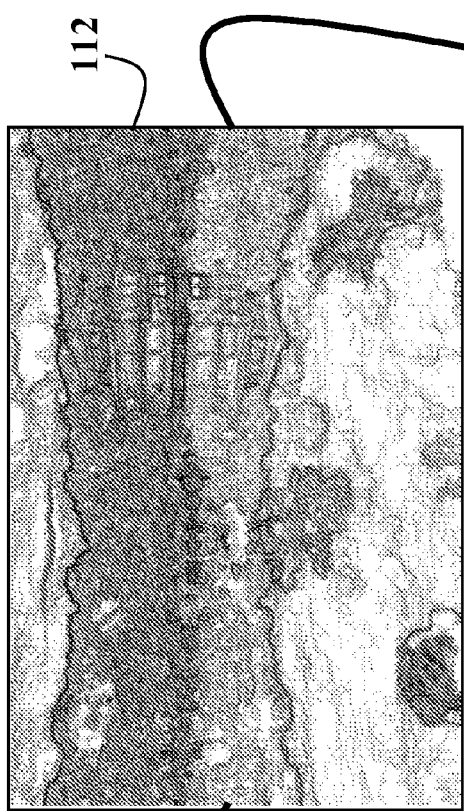
FIG. 1F is an energy image according to an embodiment of the invention.
Figure 1H:
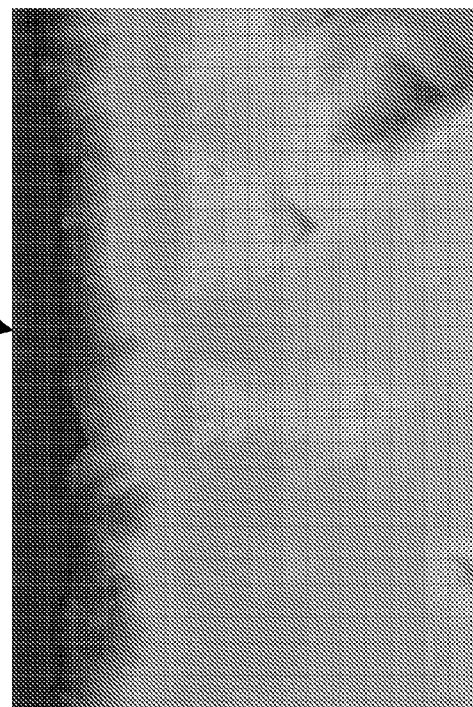
FIGS. 1G and 1H are vertical and horizontal seam index maps according to embodiments of the invention.
Figure 1G:

FIG. 1F shows an energy image 112 in terms of a magnitude of the intensity gradients. FIGS. 1G and 1H show the corresponding vertical and horizontal path maps used to determine 120 the seams 122.

Energy Preservation Measure

To evaluate the effectiveness of the different strategies for our content-aware retargeting, we determine an average energy of all of pixels in the source image 100 as:

$$\frac{1}{|I|} \sum_{p \in I} e(p)$$

during retargeting. Randomly removing pixels keeps the average unchanged, while content-aware retargeting increases the average as the retargeting removes low energy pixels and retains high energy pixels.

There are several well-known image importance measures that we can use, such as the $L_1$-norm, the $L_2$-norm of the gradient, a saliency measure, and a Harris-corners measure.

Discrete Image Resizing

Aspect Ratio Change

We want to change the aspect ratio of a source image I from n×m to n×m', where m−m'=c, some constant. This can be achieved by successively removing c vertical seams from the image I. In contrast with conventional scaling, the seam applications 130 according to our invention do not alter important parts of the image, as defined by the energy function 111. In effect, this generates a nonuniform, content-aware resizing of the image. FIG. 2A shows a source image. FIG. 2B shows a target image obtained according to the embodiments of the invention. FIGS. 2C and 2D show conventional scaling and cropping.

Figure 3B:
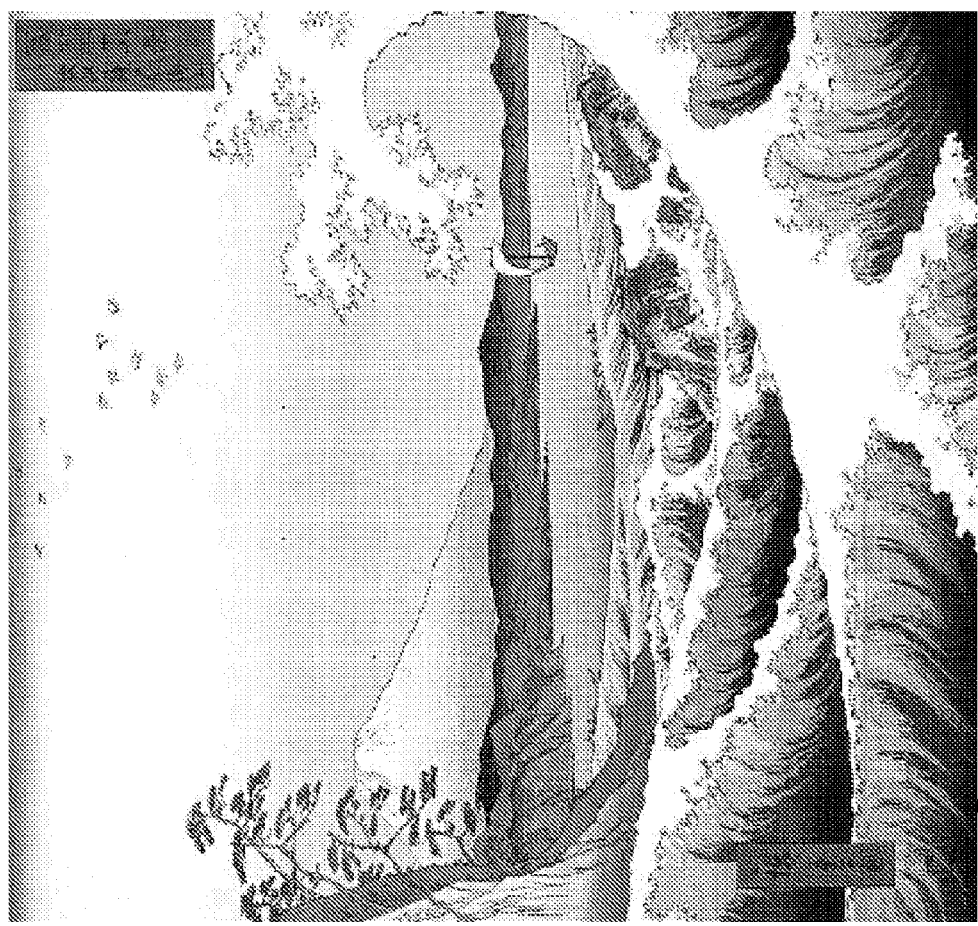
FIG. 3B is an enlarged target image obtained from the source image of FIG. 3A according to an embodiment of the invention.
Figure 3A:
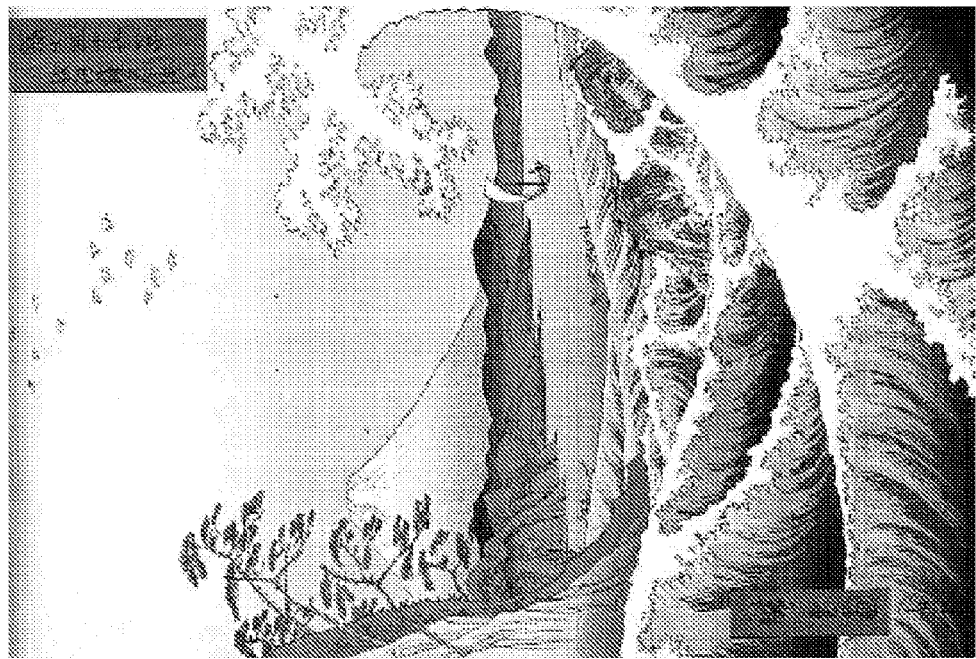
FIG. 3A is source image according to an embodiment of the invention.

As shown in FIGS. 3A and 3B, the same aspect ratio correction, from n×m to n×m'can also be achieved by increasing the number of rows by a factor of m/m'. The added value of this approach is that it does not remove any pixels from the image. We discuss our strategy for increasing the image size in detail below.

Retargeting with Optimal Seams-Order

Image retargeting generalizes aspect ratio change such that an image I of size n×m is retargeted to size n'×m'. We assume that m'<m and n'<n. The optimal order 132 for pixel removal is an optimization of the following objective function 131:

$$\min_{s^x, s^y, \alpha} \sum_{i=1}^{k} E(\alpha_i s_i^x + (1 - \alpha_i) s_i^y),$$

where k=r+c, r=(m−m'), c=(n−n'), and $\alpha_i$ is a parameter that determines whether we remove a horizontal or a vertical seam at step i, given by:

$\alpha_i \in \{0,1\}, \Sigma_{i=1}^{k} \alpha_i = r, \Sigma_{i=1}^{k} (1-\alpha_i) = c.$ We find the optimal order using a transport map T that specifies, for each desired target image size n'×m', the cost of the optimal sequence of horizontal and vertical seam applications 130.

That is, an entry T(r,c) in the transport map T stores a minimal cost needed to obtain an image of size n−r×m−c. We determine T using dynamic programming.

Starting at T(0,0)=0, we determine for each entry (r,c), selecting the best of two options: either removing a horizontal seam from an image of size n−r×m−c+1, or removing a vertical seam from an image of size n−r+1×m−c:

$$T(r, c) = \qquad (6)$$
$$\min(T(r-1, c) + E(s^x(I_{n-r-1\times m-c})), T(r, c-1) + E(s^y(I_{n-r\times m-c-1})))$$

where $I_{n-r\times m-c}$ denotes the image of size n−r×m−c, and $E(s^x(I))$ and $E(s^y(I))$ are the costs of the respective seam applications.

Given the transport map T and target size n'×m', where n'=n−r and m'=m−c, we can backtrack from T(r,c), and find the optimal path by successively moving to the minimum of the top and left neighbors of the current entry, until we reach T(0,0). Selecting a left neighbor corresponds to a vertical seam application, while selecting the top neighbor corresponds to a horizontal seam application.

Increasing Image Size

The process of removing vertical and horizontal seams can be expressed as a time-evolution process. We denote $I^{(t)}$ as a smaller image generate after t seam have been removed from the source image I.

To increase the size of an image, we approximate an 'inversion' of this time-evolution and insert new 'artificial' seams in the image. Hence, to increase the size of the source image I by one, we determine the optimal vertical (or horizontal) seam s in the image source image I, and duplicate the pixels of seam s by averaging the pixels with their left and right neighbors, or with their top and bottom neighbors in the case of a horizontal seam.

Using the time-evolution notation, we denote the resulting target image as $I^{(-1)}$. Repeating this process generates a stretching artifact by selecting the same seam. To achieve effective increasing, it is important to balance between the original image content and the inserted pixels.

Therefore, to increase the size of an image by k, we find the first k seams for removal, and duplicate these seams in order to obtain the image $I^{(-k)}$. This can be viewed as the process of traversing back in time to recover pixels from a larger image that would have otherwise been removed by seam removals.

To continue in a content-aware fashion for an excessive image size increase, for instance, an increase in size greater than 50%, we break the process into several steps. In each step, we enlarge not more than a fraction of the size of the image from the previous step, essentially guarding the important content from being stretched.

Content Enlargement

Figures 4A, 4B:
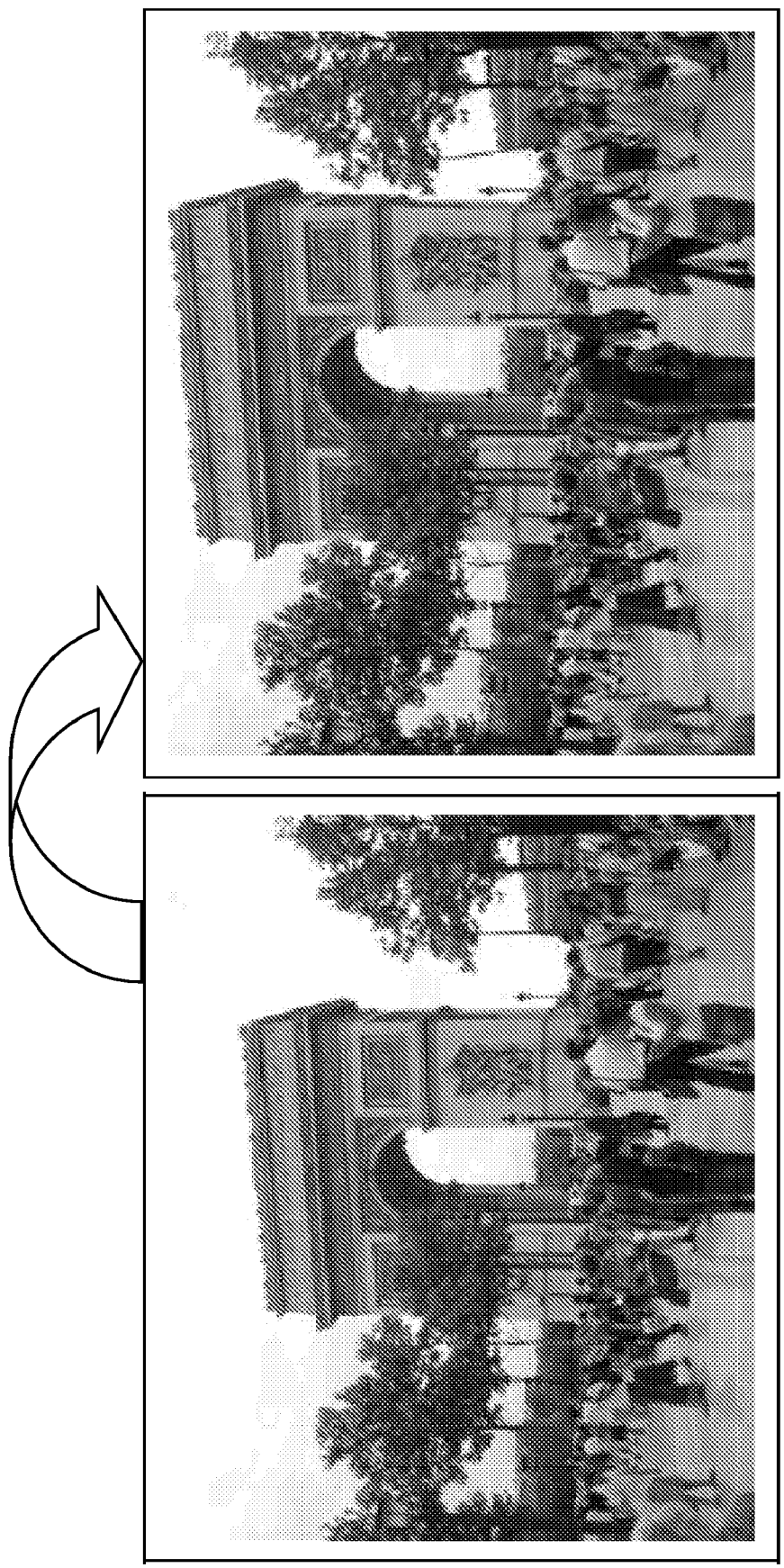
FIG. 4A is source image according to an embodiment of the invention.
FIG. 4B is a target image with enlarged content obtained from the source image of FIG. 4A according to an embodiment of the invention.

Instead of increasing the size of the image, our image retargeting can be used to magnify or enlarge the content of the image, while preserving its size and shape. This can be achieved by combining seam removal and standard image scaling. To preserve the image content as much as possible, we first use conventional image scaling to increase the size of the image. Then, we apply seam removal on the larger image to reduce the image back to its original size, see FIGS. 4A and 4B. Note that the removed pixels are, in effect, sub-pixels of the source image. Content enlargement is effectively similar to data-driven zooming in. Zooming out or reducing the content can be done in a similar manner.

Seam Removal in the Gradient Domain

There are times when removing multiple seams from a source image still causes noticeable visual artifacts in the target image. To overcome this, we can combine seam removal with a Poisson reconstruction, see U.S. Pat. No. 7,038,185, "Camera for directly generating a gradient image," issued to Tumblin et al. on May 2, 2006.

Specifically, we determine the energy image 112 as before, but instead of removing the seams from the source image, we work in the gradient domain and remove the seams from the x and y derivatives (gradients) of the source image. At the end of this process we use a Poisson solver to reconstruct the target the image 109.

Object Removal

Figure 5B:
FIG. 5B is a target image with an object removed from the source image of FIG. 4A according to an embodiment of the invention.
Figure 5A:
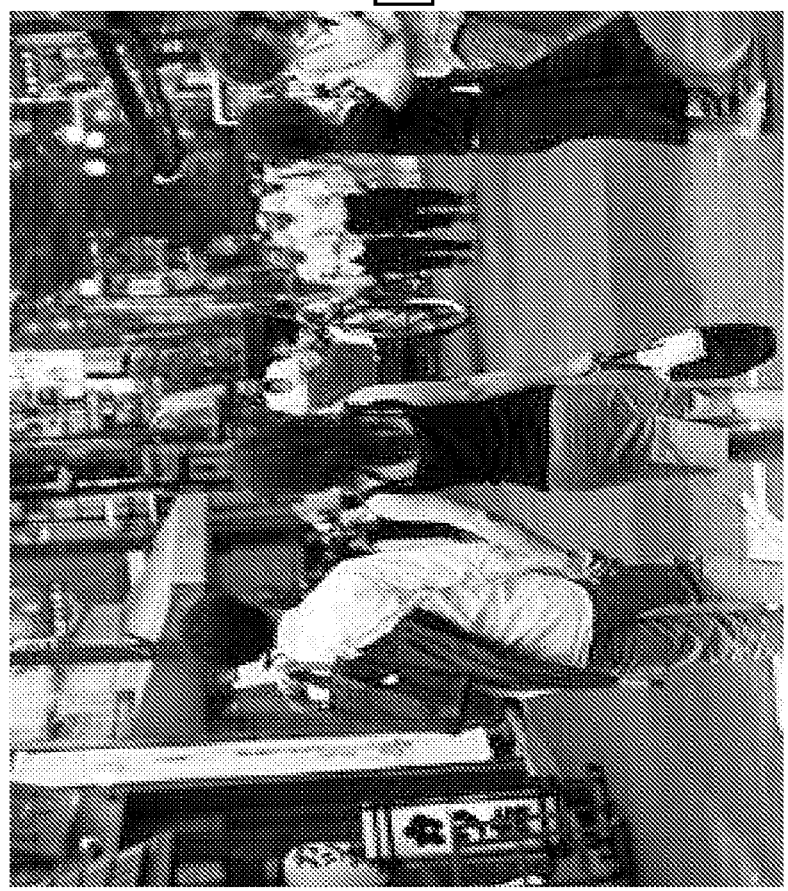
FIG. 5A is source image according to an embodiment of the invention.
Figure 6B:
FIG. 6B is a target image with an object removed and resized from the source image of FIG. 6A according to an embodiment of the invention.
Figure 6A:
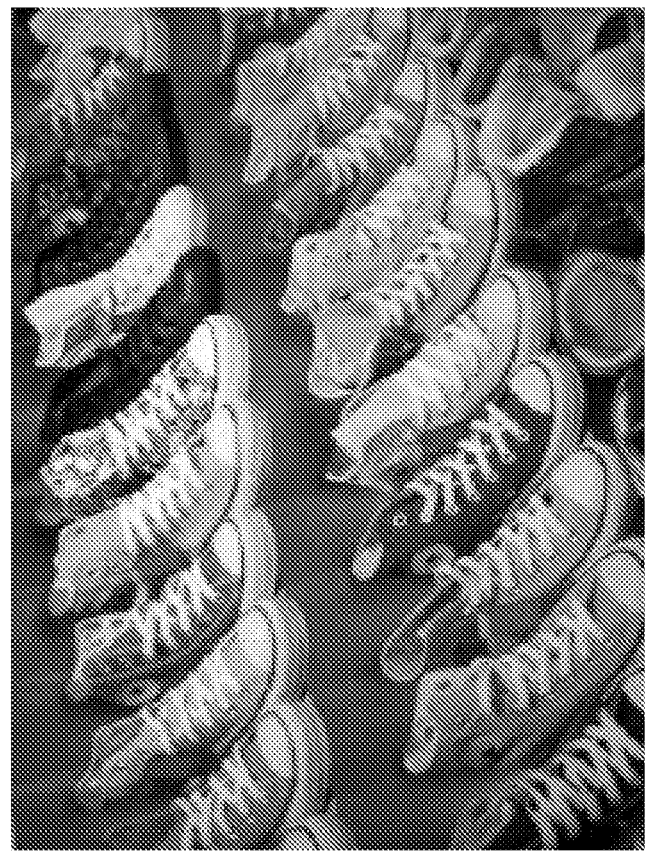
FIG. 6A is source image according to an embodiment of the invention.

We can also remove an object from the source image. The pixels associated with the object are marked, and seams are removed from the image until all marked pixels are gone. We can automatically determine the smaller of the vertical or horizontal diameters, in terms of pixels, of the target removal region and perform vertical or horizontal removals accordingly, see FIGS. 5A and 5B. In the examples shown in FIGS. 6A and 6B, an object (one shoe) is removed. After the object removal, the image is increased to its original size. Note that this example would be difficult to accomplish using conventional in-painting or texture synthesis.

Multi-Size Images

So far, we assume that the size of the target image 109 is known. However, this might not be possible in some cases. Consider, for example, an image embedded in a web page. The page designer does not know, ahead of time, at what size the web page will eventually be displayed. Therefore, the designer cannot generate a single target image. In a different scenario, the user might want to explore target images with different sizes and select a most suitable size.

Seam applications are linear in the number of pixels, and image retargeting is therefore linear in the number of seams to be removed or inserted. On the average, we can retarget an image of size 400×500 to 100×100 in a couple of seconds. However, determining tens or hundreds of seams for multiple different sized images is a challenging task when it is to be done in real time.

To address this issue, we provide a representation of multi-size images that encodes, for a source image 100 of size (m×n), an entire range of retargeting sizes from 1×1 to m×n, and even larger to N'×M', when N'>n, M'>m. This information enables continuous retargeting of an image in real time. From a different perspective, this can be seen as storing an explicit representation of the implicit time-evolution process of seam applications.

Figure 7A:
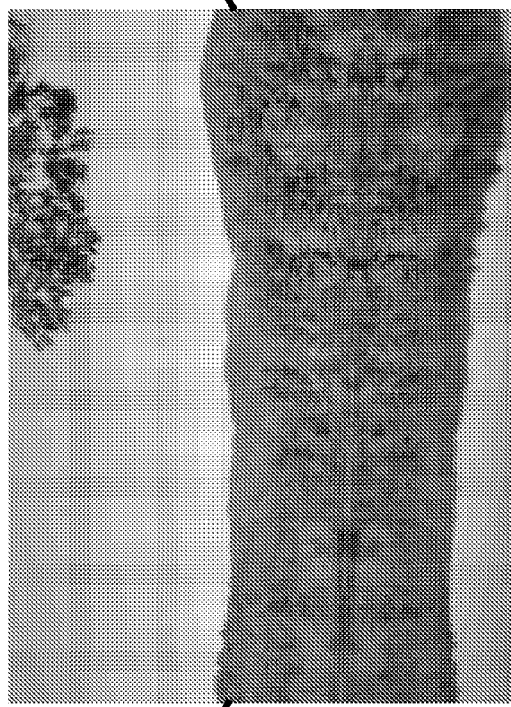
FIG. 7A is a source image according to an embodiment of the invention.

First, consider the case of changing the width of the source image shown in FIG. 7A. We define an index map V of size n×m that encodes, for each pixel, the index of the seam that removed it, e.g., $V(i,j)=t$ means that pixel (i,j) is removed by the vertical $t^{th}$ seam removal, see FIG. 7B. The order or index for seam removal is shown dark to light. To get an image of width m', we only need to gather, in each row, all pixels with a seam index greater than or equal to m−m'.

For example, pixels removed by the first seam get the index number 1, and are deemed less important than pixels removed by a seam with index number 20.

This representation supports image enlarging as well as image reduction. For example, if we want to support enlarging of the image up to size M'>m, we enlarge the image using seam insertion to a size n×M' as described above.

However, instead of averaging the pixels in the $k^{th}$ seam with the pixels in the two neighboring seams, we do not modify the source image pixels in the seam, but insert new pixels into the image as the average of the $k^{th}$ seam and its left (or right) pixel neighbor. The inserted seams are given a negative index starting at −1.

To enlarge the source image by k, where $m \leq k \leq M'$, we use exactly the same procedure of gathering, from the enlarged image, all pixels whose seam index is greater than (m−(m+k))=−k, and obtain an image of size m−(−k)=m+k.

Figure 7C:
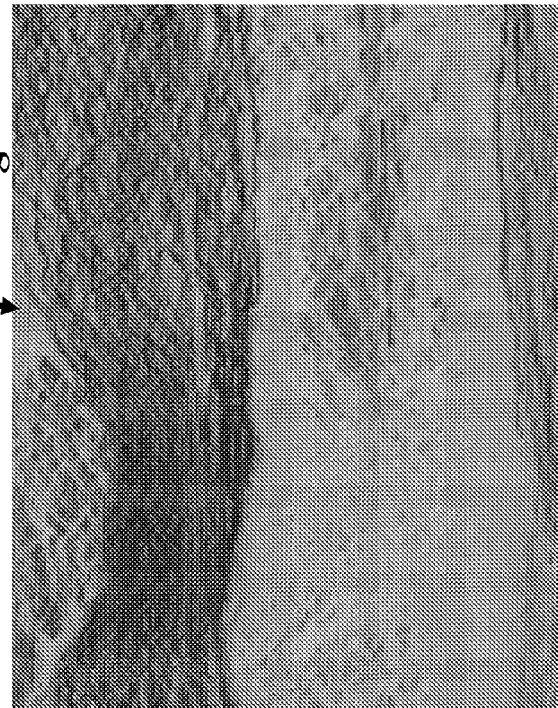
FIGS. 7B and 7C are horizontal and vertical index maps corresponding to the source image of FIG. 7A according to an embodiment of the invention.
Figure 7B:
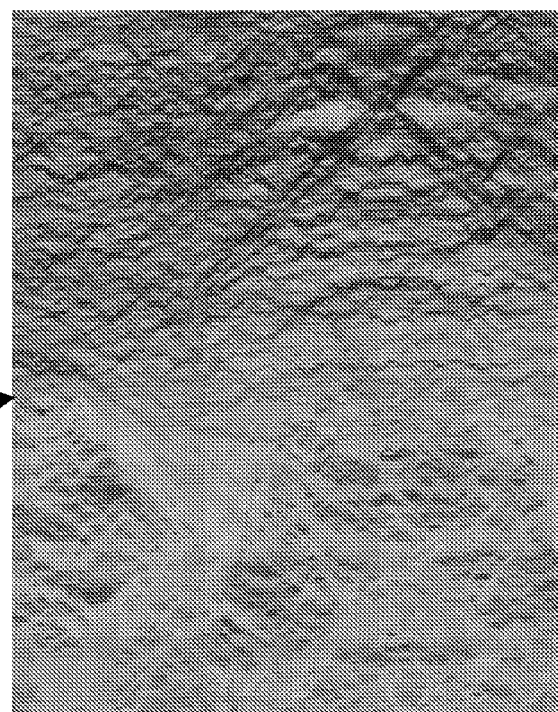

Determining a horizontal index map H for image height enlarging and reduction is achieved in a similar manner, see FIG. 7C. However, supporting resizing in both image dimensions, while determining index maps H and V independently can cause problems. This is because horizontal and vertical seams can intersect in more than one place, see FIGS. 7B and 7C, and removing a seam in one direction may affect the index map in the other direction. One way to avoid this is to allow seam removal in one direction, and use degenerate seams, i.e., degenerate rows or columns, in the other direction.

Constructing Consistent Index Maps

Determining the horizontal index map H and the vertical index map V independently for multi-size images does not work. To see why, we start with a definition. The maps H and V are consistent if every horizontal seam intersects all the vertical seam indexes, and every vertical seam intersects all horizontal seam indexes.

Consistency assures that removing a seam in any dimension removes exactly one pixel from all seams in the other dimension, retaining the index map structure. If consistency is not maintained, then after removing one horizontal seam we might be left with vertical seams with different number of pixels and the rectangular structure of the image is affected.

Aside from limiting seams to be rows or columns in one (or two) of the dimensions, we describe another approach to this problem that is restricted to temporally zero-connected seams. These are seams that are spatially connected on the source image $I^{(0)}$.

For such seams, the only possible violation of consistency between the H and V maps can occur in diagonal seam steps. Our method first determines temporally zero-connected seams in one direction, e.g., vertical, and then impose the constraints on the diagonal when determining the seams in the other direction.

To understand why the only violation of consistency occurs in diagonals, assume, without loss of generality, that some vertical seam $j \in \{1, \ldots, m\}$ violates the consistency constraint. This means that the seam does not intersect all horizontal seams $1, \ldots, n$. Hence, the seam must touch some horizontal seam $i \in \{1, \ldots, n\}$ more than once.

Denote the pixels where seam j intersects seam i as p and q. Because pixels p and q are part of a vertical seam j, the pixels cannot be in the same row. However, the pixels are also part of the horizontal seam i, and cannot be in the same column.

Let us examine the rectangle defined in its two corners by p and q. Seams i and j are connected inside this rectangle and the seams touch the corners. However, one is a vertical seam and the other a horizontal seam. The only possibility for this to happen is that the rectangle is in fact a square, and both seams pass through the diagonal of the square.

Note that the above deduction relies on the fact that all seams are connected in the image at one place, which is not true if we use non-zero-connected seams, see FIG. 1E. Because we restrict ourselves to temporally zero-connected seams in both directions, we can replace the time-evolution process of determining 120 the seams 122 by concurrently determining all of the seams in each dimension. The reason is that, for zero-connected seams, we can examine the source size image and process each pair of rows independently.

For each pair of rows, we can find the optimal set of 1-edge paths linking all pixels of one row to all pixels of the next row. The global multiple seam paths from the top of the image to the bottom of the image are the concatenation of those 1-edge paths.

Finding the best 1-edge paths between a pair of rows is similar to a weighted assignment problem where each pixel in one row (or column) is connected to its three neighboring pixels in the other row (or column). We use the well known Hungarian algorithm to solve this weighted assignment problem. The Hungarian algorithm is described in, for example, a textbook entitled "Network Programming," by K. Murty, Prentice Hall, Englewood Cliffs, N.J., 1992, pp. 168-187.

Figure 8B:
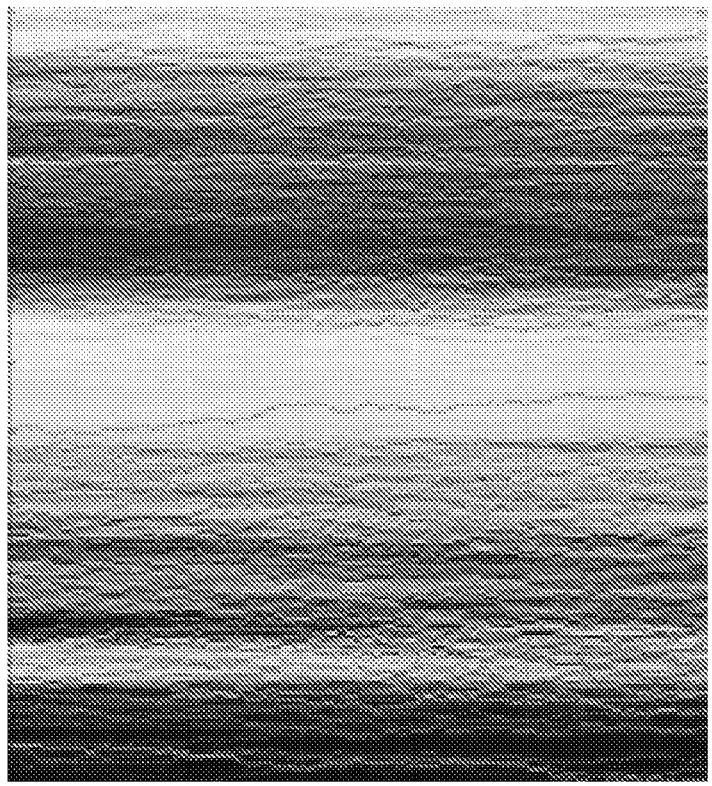
FIGS. 8A and 8B are consistent index maps corresponding to the horizontal and vertical index maps of FIGS. 7B and 7C according to an embodiment of the invention.
Figure 8A:
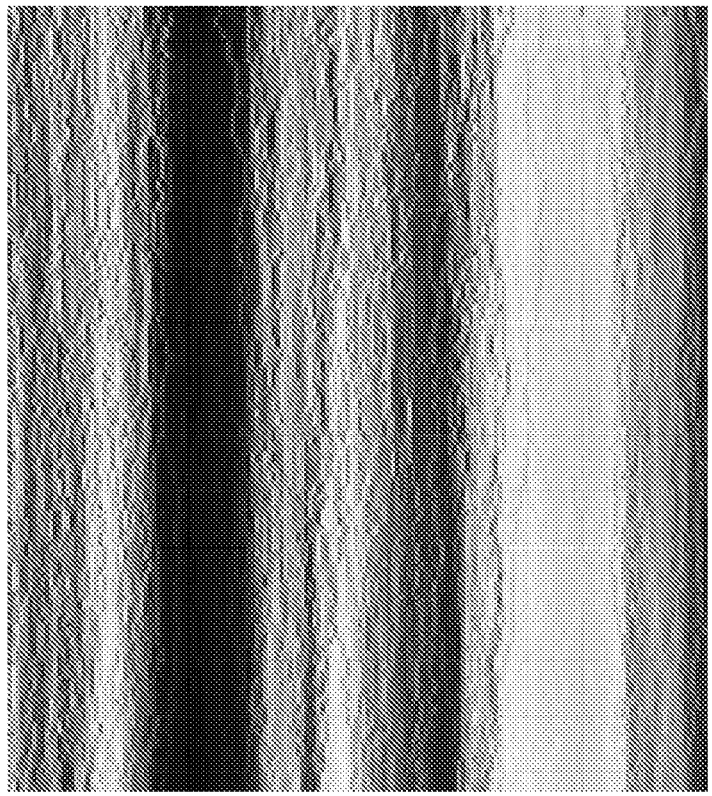

After we find the multi-seams paths in one dimension, we repeat the process in the other dimension, but we mask out every diagonal edge that was already used by any of the first direction seams. This guarantees that the seams in the second dimension are consistent with the first dimension as shown for the consistent seams of FIGS. 8A and 8B, corresponding to inconsistent seams of FIGS. 7B and 7C, respectively.

EFFECT OF THE INVENTION

The embodiments of the present invention provide seam applications for content-aware image retargeting. Seams are determined as optimal minimum energy paths in a source image. Pixels can be removed or inserted along the seams.

The seam applications can be used for a variety of image manipulation operations including: aspect ratio changes, image resizing, content enlargement, and object removal. The seam applications can be integrated with various saliency measures, as well as user input, to guide the retargeting process. In addition, the invention provides a data structure for multi-size images that supports continuous retargeting in real time.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A computer-implemented method for content-aware image retargeting of a source image having pixels, comprising:
using an apparatus to perform the method comprising the steps of:
generating an energy image from the source image, in which each pixel in the energy image is assigned energy of the corresponding pixel in the source image according to an energy function;
determining, from the energy image, a seam of pixels in the energy image that has a minimal energy according to a minimizing function, in which the minimal energy seam is one pixel wide and extends from one side of the energy image to an opposite side of the energy image;
applying the minimal energy seam to the source image to obtain a target image that preserves a rectangular shape of the source image; and
wherein the energy function determines a gradient magnitude for each pixel in the source image and assigns the gradient magnitude as the energy of the corresponding pixel in the energy image.

2. The method of claim 1, in which pixels in the source image similar to neighboring pixels have a low energy, and pixels in the source image dissimilar to neighboring pixels have a high energy.

3. The method of claim 1, in which the energy function is $$e_1(I) = \left|\frac{\partial}{\partial x}I\right| + \left|\frac{\partial}{\partial y}I\right|,$$

where I(x,y) is a particular pixel in the source image.

4. The method of claim 1, in which the source image is of size n×m pixels, the pixels in the source image are indexed in a vertical dimension by indices i=1, ..., n, and in a horizontal dimension by indices j=1, ..., m, and in which a vertical seam $s^x$ is:

$$s^x = \{s_i^x\}_{i=1}^n = \{(x(i),i)\}_{i=1}^n, s.t. \forall i, |x(i)-x(i-1)| \leq 1,$$

where x is a mapping x: [1, ..., n]→[1, ..., m], and a horizontal seam $s^y$ is:

$$s^y = \{s_j^y\}_{j=1}^m = \{(j,y(j))\}_{j=1}^m, s.t. \forall j, |y(j)-y(j-1)| \leq 1,$$

where y is a mapping y: [1, ..., m]→[1, ..., n].

5. The method of claim 4, in which the pixels I of the vertical seams s are $$I_s = \{I(s_i)\}_{i=1}^n = \{I(x(i),i)\}_{i=1}^n,$$

and, given an energy function e, the energies E of the vertical seams are $$E(s) = E(I_s) = \Sigma_{i=1}^n e(I(s_i)),$$

and the minimal energy seam s* is $$s^* = \min_s E(s) = \min_s \sum_{i=1}^n e(I(s_i)).$$

6. The method of claim 1, in which the energy function is $$e_1(I) = \left|\frac{\partial}{\partial x}I\right| + \left|\frac{\partial}{\partial y}I\right|,$$

where I(x,y) is a particular pixel in the source image, and the minimizing function is $$s^* = \min_s E(s) = \min_s \sum_{i=1}^n e(I(s_i)),$$

where s* is the seam of pixels in the energy image that has a minimal energy, n is a size of the source image in a particular dimension, the pixels in the source image are indexed in the particular dimension by indices i=1, ..., n, and E(s) are the energies of all possible seams $s_i$.

7. The method of claim 1, in which the minimal energy seam is determined using dynamic programming.

8. The method of claim 1, in which the applying decreases a size of the source image by removing the pixels in the source image corresponding to the pixels in the minimal energy seam.

9. The method of claim 1, in which the applying increases a size of the source image by averaging the pixels in the source image corresponding to the pixels in the minimal energy seam with neighboring pixels and duplicating the averaged pixels in the target image.

10. The method of claim 1, further comprising the steps of:
marking pixels associated with an object in the source image;
determining a minimal energy seam including pixels corresponding the marked pixels; and
removing the pixels in the source image corresponding to the pixels in the minimal energy seam.

11. The method of claim 1, in which the generating, determining, and applying is performed successively for multiple horizontal and vertical minimal energy seams according to an objective function.

12. The method of claim 11, further comprising the steps of:
storing an optimal order of the successive generating, determining, and applying.

13. The method of claim 12, in which an optimal order of successive horizontal and vertical minimal energy seam applications is determined using $$T(r, c) = \min(T(r-1, c) + E(s^x(I_{n-r-1 \times m-c})), T(r, c-1) + E(s^y(I_{n-r \times m-c-1}))),$$

where $I_{n-r \times m-c}$ denotes a target image of size n−r×m−c, the source image is of size n×m, r is a number of horizontal minimal energy seam applications, c is a number of vertical minimal energy seam applications, and $E(s^x(I))$ and $E(s^y(I))$ are energies of the successive vertical and horizontal minimal energy seam applications, respectively, and further comprising the steps of:
determining a path from T(r,c) to T(0,0) to determine the optimal order.

14. A computer-implemented method for content-aware image retargeting of a source image having pixels, comprising:
using an apparatus to perform the method comprising the steps of:
generating an energy image from the source image, in which each pixel in the energy image is assigned energy of the corresponding pixel in the source image according to an energy function;
determining, from the energy image, a seam of pixels in the energy image that has a minimal energy according to a minimizing function, in which the minimal energy seam is one pixel wide and extends from one side of the energy image to an opposite side of the energy image;
applying the minimal energy seam to the energy image to obtain a next energy image; and
reconstructing a target image from the next energy image that preserves a rectangular shape of the source image; and
wherein the energy function determines a gradient magnitude for each pixel in the source image and assigns the gradient magnitude as the energy of the corresponding pixel in the energy image.

15. The method of claim 14, in which the reconstructing uses a Poisson solver.

16. A computer-implemented method for real-time content-aware image retargeting of a source image having pixels, comprising:
using an apparatus to perform the method comprising the steps of:
determining an order of minimal energy seam applications, the determining further comprising:
generating an energy image from the source image according to an energy function, in which each pixel in the energy image is assigned energy of the corresponding pixel in the source image;
determining, from the energy image, a seam of pixels in the energy image that has a minimal energy according to a minimizing function, in which the minimal energy seam is one pixel wide and extends from one side of the energy image to an opposite side of the energy image; and
applying the minimal energy seam to the source image to obtain a next source image that preserves a rectangular shape of the source image; and
repeating the generating, determining, and applying for the next source image to determine the order of minimal energy seam applications;
enlarging the source image using minimal energy seam applications to obtain an enlarged source image;
constructing an index map having entries, each entry in the index map corresponding to a pixel in the enlarged source image and having an index number, the index number corresponding to the order of minimal energy seam applications;
selecting a particular index number corresponding to a desired size of a target image; and
producing the target image of the desired size from the enlarged source image using the index map and the particular index number.

17. The method of claim 16, further comprising the steps of:
constructing a horizontal index map and a horizontal enlarged source image to enable real-time image retargeting of the source image in the horizontal dimension;
constructing a vertical index map and a vertical enlarged source image to enable real-time image retargeting of the source image in the vertical dimension; and
associating the horizontal and vertical index maps and the horizontal and vertical enlarged source images with the source image.

18. The method of claim 16, in which the minimal energy seam applications use zero-connected minimal energy seams, and further comprising the steps of:
determining an order of minimal energy seam applications in a first dimension that produces a first plurality of target images from the source image;
determining an order of minimal energy seam applications in a second dimension, such that each zero-connected minimal energy seam in the second dimension intersects the zero-connected minimal energy seams in the first dimension only once;
enlarging the source image using minimal energy seam applications to obtain an enlarged source image;
constructing a first index map having entries, each entry in the index map corresponding to a pixel in the enlarged source image and having a first index number, the first index number corresponding to the order of minimal energy seam applications in the first dimension;
constructing a second index map having entries, each entry in the index map corresponding to a pixel in the enlarged source image and having a second index number, the second index number corresponding to the order of minimal energy seam applications in the second dimension; and selecting a particular first index number and a particular second index number corresponding to a desired size of a target image; and producing a target image of the desired size from the enlarged source image using the first and second index maps, the particular first index number, and the particular second index number.

* * * * *